(12) United States Patent
Takaoka et al.

(10) Patent No.: US 7,163,643 B2
(45) Date of Patent: Jan. 16, 2007

(54) DRIVING ELECTROLYTE AND ELECTROLYTIC CAPACITOR USING THE SAME

(75) Inventors: Ryoko Takaoka, Hirakata (JP); Kazumitsu Honda, Hirakata (JP); Yuuichiro Tsubaki, Uji (JP); Yukiyasu Sugihara, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 173 days.

(21) Appl. No.: 10/874,377

(22) Filed: Jun. 24, 2004

(65) Prior Publication Data

US 2004/0262566 A1 Dec. 30, 2004

(30) Foreign Application Priority Data

Jun. 26, 2003 (JP) ............................. 2003-182305
Jun. 26, 2003 (JP) ............................. 2003-182307

(51) Int. Cl.
*H01G 9/035* (2006.01)

(52) U.S. Cl. .................... 252/62.2; 361/504; 361/506; 361/507

(58) Field of Classification Search .................... None
See application file for complete search history.

(56) References Cited

U.S. PATENT DOCUMENTS 6,058,006 A * 5/2000 Yoshioka et al. ........... 361/511
6,587,329 B1 * 7/2003 Feger ......................... 361/504

FOREIGN PATENT DOCUMENTS

| EP | 556948 | * | 8/1992 |
| JP | 2-224217 | | 9/1990 |
| JP | 03-74828 | * | 3/1991 |
| JP | 03-74829 | * | 3/1991 |
| JP | 3-209810 | | 9/1991 |

OTHER PUBLICATIONS

Translation for JP 3-74829.*
Translation for JP 3-74828.*

* cited by examiner

Primary Examiner—C. Melissa Koslow
(74) Attorney, Agent, or Firm—Wenderoth, Lind & Ponack, L.L.P.

(57) ABSTRACT

A driving electrolyte containing a solvent, a solute containing the following compounds represented by General Formulae (1) and (2) prepared by synthesis, and a nitro compound,

$$M^1OOC-\underset{R^1}{CH}-(CH_2)_n-\underset{R^2}{CH}-COOM^2 \tag{1}$$

(wherein, each of $R^1$ and $R^2$ is independently an alkyl group; each of $M^1$ and $M^2$ is a functional group selected from the group consisting of a hydrogen atom, an ammonium group and an amine group; and n is an integer of 0 to 14),

$$M^3OOC-\underset{R^3}{CH}-(CH_2)_m-OR^4 \tag{2}$$

(wherein, $R^3$ is an alkyl group; $R^4$ is a functional group selected from the group consisting of a hydrogen atom, a methyl group and an ethyl group; $M^3$ is a functional group selected from the group consisting of a hydrogen atom, an ammonium group and an amine group; and m is an integer of 0 to 14).

20 Claims, 1 Drawing Sheet

FIG.1

DRIVING ELECTROLYTE AND ELECTROLYTIC CAPACITOR USING THE SAME

BACKGROUND OF THE INVENTION

1. Field of the Invention

The present invention relates to a driving electrolyte and an electrolytic capacitor using the same.

2. Description of the Related Art

Nonaqueous driving electrolytes containing an organic carboxylic acid such as azelaic acid, sebacic acid, adipic acid, or the like, or the salt thereof as the solute in ethylene glycol as the solvent have been known as the driving electrolytes conventionally used for electrolytic capacitors. These nonaqueous driving electrolytes have long been used for high-voltage applications, as they are relatively favorable in chemical self-restoring ability even under an environment at 100° C. or more. Here, the chemical self-restoring ability means an ability to repair the defects on dielectric oxide films when formed.

Because the nonaqueous driving electrolytes above degrade more readily due to esterification reactions that occur at high temperature, a dibasic acid having one or more side-chains such as 1,6-decanedicarboxylic acid, 5,6-decanedicarboxylic acid, 1,7-octanedicarboxylic acid, or the like, or the salt thereof has been commonly used therein as the electrolyte for suppressing the esterification reactions. Such electrolytic capacitors include, for example, the electrolytic capacitors disclosed in Jpn. Unexamined Patent Publication Nos. 2-224217 and 3-209810.

On the other hand, for electrolytic capacitors for use in harmonic-suppressing circuits and vehicle applications, there exists more recently a demand for a driving electrolyte that is higher in electrical conductivity, higher in sparkover voltage at high temperature, longer in lifetime, more resistant to breakdown of the dielectric oxide film on electrodes, and superior in the ability to repair defects on the dielectric oxide film when formed (chemical self-restoring ability) and to suppress chemical reactions at high temperature.

However, when a dibasic acid having a side-chain or the salt thereof described above is used as a solute of driving electrolytes, the dibasic acid having a side-chain or the salts thereof, such as containing only a side chain in the neighborhood of only one of the carboxyl groups, do not have sufficiently high heat resistance at elevated temperature and leads to significant decrease in electrical conductivity at high temperature due to easier esterification reactions of the carboxyl groups of solutes with alcohols such as ethylene glycol and the like therein over time and consequently to significant deterioration in the properties of electrolytic capacitors.

DISCLOSURE OF THE INVENTION

An object of the invention is to provide a driving electrolyte higher in electrical conductivity, chemical self-restoring ability at high temperature, and heat resistance, and longer in lifetime, and an electrolytic capacitor using the same.

A driving electrolyte according to an aspect of the present invention comprises a solvent, a solute containing the following compounds represented by General Formulae (1) and (2) prepared by synthesis, and a nitro compound, (wherein, each of $R^1$ and $R^2$ is independently an alkyl group; each of $M^1$ and $M^2$ is a functional group selected from the group consisting of a hydrogen atom, an ammonium group and an amine group; and n is an integer of 0 to 14), (wherein, $R^3$ is an alkyl group; $R^4$ is a functional group selected from the group consisting of a hydrogen atom, a methyl group and an ethyl group; $M^3$ is a functional group selected from the group consisting of a hydrogen atom, an ammonium group and an amine group; and m is an integer of 0 to 14).

The driving electrolyte suppresses the decrease in electrical conductivity and gas generation at high temperature for an extended period of time and improves the chemical self-restoring ability, and thus provides a driving electrolyte that contributes to improvement in the pressure and heat resistance of electrolytic capacitors and extension of the lifetime thereof.

A driving electrolyte according to another aspect of the present invention comprises a solvent, a solute containing the compounds represented by General Formulae (1) and (2) prepared by synthesis, and at least one compound selected from the group consisting of phosphoric acids, phosphorous acids, the salts thereof, and phosphoric alkylesters.

The driving electrolyte suppresses the decrease in electrical conductivity and improves chemical self-restoring ability at high temperature for an extended period of time and improves the chemical self-restoring ability, and thus provides a driving electrolyte that contributes to improvement in the pressure and heat resistance of electrolytic capacitors and extension of the lifetime thereof.

An electrolytic capacitor according to yet another aspect of the present invention is an electrolytic capacitor employing a driving electrolyte, wherein the driving electrolyte comprises a solvent, a solute containing the compounds represented by General Formulae (1) and (2) prepared by synthesis, and a nitro compound.

The driving electrolyte in the electrolytic capacitor suppresses the decrease in electrical conductivity and gas generation at high temperature for an extended period of time and improves the chemical self-restoring ability, and improves the chemical self-restoring ability, and thus the electrolytic capacitor is superior in pressure and heat resistance over an extended period of time and has a longer lifetime.

An electrolytic capacitor according to yet another aspect of the present invention is an electrolytic capacitor employing a driving electrolyte, wherein the driving electrolyte comprises a solvent, a solute containing the compounds represented by General Formulae (1) and (2) prepared by synthesis, and at least one compound selected from the group consisting of phosphoric acids, phosphorous acids, the salts thereof, and phosphoric alkylesters.

The driving electrolytes in the electrolytic capacitor suppresses the decrease in electrical conductivity and gas generation at high temperature for an extended period of time and improves the chemical self-restoring ability, and thus the electrolytic capacitor is superior in pressure and heat resistance over an extended period of time and has a longer lifetime.

BEST MODES OF CARRYING OUT THE INVENTION

A driving electrolyte according to the present invention includes a solvent, a solute containing the compounds represented by General Formulae (1) and (2) prepared by synthesis, and a nitro compound.

The compounds represented by General Formulae (1) and (2) prepared by synthesis raise the sparkover voltage of electrolytic capacitors, as they reduce deterioration in electrical conductivity and have a greater chemical self-restoring ability than 1,6-decanedicarboxylic acid or 5,6-decanedicarboxylic acid.

The nitro compound added in the present invention has a role of reducing both gas generation and corrosion, as it suppresses gas generation by oxidizing the hydrogen gas generated in the product and the complex-forming reaction between acids and aluminum foil, but it also decreases the sparkover voltage of driving electrolytes. Accordingly, the nitro compound may not be added in a large amount to the driving electrolyte employing 1,6-decanedicarboxylic acid or 5,6-decanedicarboxylic acid.

However, the driving electrolyte improved in chemical self-restoring ability by employing the solute according to the present invention allows addition of a larger amount of the nitro compound and consequently drastic suppression of the gas generation and corrosion of the products. Accordingly, such a driving electrolyte alleviates the decrease in electrical conductivity at high temperature for an extended period of time, suppresses the gas generation, and increases the chemical self-restoring ability, and thus provides a driving electrolyte that improves the pressure and heat resistance of electrolytic capacitors and extends the lifetime thereof.

The amount of the nitro compound added is preferably 0.1 to 10 wt %. If the amount of the nitro compound added is less than 0.1 wt %, the driving electrolyte is less effective in suppressing the gas generation at high temperature as well as in protecting the oxide film on electrode aluminum foils in the electrolyte at high temperature. In addition, as excessive addition thereof leads directly to short circuiting, the amount is preferably 10 wt % or less and more preferably 5 wt % or less.

Alternatively, the driving electrolyte according to the present invention may include a solvent, a solute containing the compounds represented by General Formulae (1) and (2) prepared by synthesis, and at least one compound selected from the group consisting of phosphoric acids, phosphorous acids, the salts thereof, and phosphoric alkylesters.

The driving electrolyte reduces the decrease in electrical conductivity at high temperature for an extended period of time and increases the chemical self-restoring ability, and thus provides a driving electrolyte that improves the pressure and heat resistance of electrolytic capacitors and extends the lifetime thereof.

The total amount of the phosphoric acid, phosphorous acid, the salt thereof and phosphoric alkylester added is preferably 0.1 to 10 wt %. If the amount of the phosphorus compounds added is less than 0.1 wt %, the driving electrolyte cannot improve the chemical self-restoring ability at high temperature and becomes less effective in protecting the oxide film on electrode aluminum foils therein at high temperature. As excessive addition thereof directly triggers short circuiting, the amount is preferably 10 wt % or less, and more preferably 5 wt % or less.

The compounds represented by General Formulae (1) and (2) prepared by synthesis used in the driving electrolytes above are obtained, for example, by reacting a malonic acid diester with an alkyl halide in the presence of a base and additionally with a dihalogenated alkane and subjecting the resulting product to an acid or alkali hydrolysis and a decarboxylation reaction. These compounds usually have an irregular molecular structure, which is effective in raising the electric conductivity of the resulting electrolytes.

The compound represented by General Formula (1) is a dibasic acid or it's salt and has two alkyl groups respectively at the α-carbons of the two carboxylic acid groups therein (i.e. —COOM$^1$ and —COOM$^2$). Alternatively, the compound represented by General Formula (2) also has an alkyl group at the α-carbon of the carboxylic acid group (i.e. —COOM$^3$). These alkyl groups may be the same or different groups, and may be branched.

These alkyl groups, said R$^1$, R$^2$ and R$^3$, each are preferably an alkyl group having 1 to 7 carbons, more preferably, an alkyl group having 1 to 5 carbons, and still more preferably an straight chain alkyl group having 1 to 4 carbons (methyl, ethyl, propyl, or butyl group).

In the General Formulae (1) and (2) above, each of n and m is independently an integer of 0 to 14 and preferably an integer of 2 to 10.

Examples of the solvents include ethylene glycol, propylene glycol, diethylene glycol, 1,4-butanediol, glycerin, water, polyoxyalkylene polyols, amides, alcohols, ethers, nitriles, furans, sulfolanes, carbonates, lactones, imidazolidinones, pyrrolidones. These solvents may be use alone or in combination of two or more solvents.

Typical examples of the solvents are described below, as classified by group. The polyoxyalkylene polyols include polyethylene oxide, polypropylene oxide, and polyoxyethylene-oxypropylene glycols having a molecular weight of 200 or less, and these polyoxyalkylene polyols may be used alone or in combination of two or more. The amides are, for example, N-methylformamide, N,N-dimethylformamide, N-methylacetamide, N-methylpyrrolidinone, and the like. The alcohols are, for example, methanol, ethanol, and the like.

Examples of the ethers include methylal, 1,2-dimethoxyethane, 1-ethoxy-2-methoxyethane, 1,2-diethoxyethane, ethylene glycol monomethylether, ethylene glycol monoethylether, ethylene glycol monobutylether, ethylene glycol dimethylether, ethylene glycol diethylether, ethylene glycol dibutylether, diethylene glycol monomethylether, diethylene glycol monoethylether, diethylene glycol dimethylether, diethylene glycol diethylether, diethylene glycol dibutylether, triethylene glycol monobutylether, triethylene glycol dimethylether, and the like.

The nitriles are, for example, acetonitrile, 3-methoxypropionitrile, and the like. The furans are, for example, 2,5-dimethoxytetrahydrofuran and the like. The sulfolanes include sulfolane, 3-methylsulfolane, 2,4-dimethylsulfolane, and the like. The carbonates include propylene carbonate, ethylene carbonate, diethyl carbonate, styrene carbonate, dimethyl carbonate, methylethyl carbonate, and the like.

Examples of the lactones include γ-butyrolactone, γ-valerolactone, δ-valerolactone, 3-methyl- 1,3-oxaziridin-2-one, 3-ethyl- 1,3-oxazoridin-2-one, and the like. The imidazolidinones are, for example, 1,3-dimethyl-2-imidazolidinone and the like. The pyrrolidones include, for example, polyvinylpyrrolidone and the like.

Among the solvents above, ethylene glycol, propylene glycol, diethylene glycol, water, alcohols, ethers, nitrites, furans, carbonates, and lactones are more preferably used. Typical examples of the compounds represented by General Formulae (1) and (2) prepared by synthesis are summarized in TABLE 1.

The compounds represented by General Formulae (1) and (2) are preferably ammonium or amine salts.

These ammonium or amine salts provide higher electrical conductivity, suppress the esterification reaction with ethylene glycol, and reduce the decrease in electrical conductivity at high temperature.

The ammonium salts include quaternary ammonium salts in addition to ordinary ammonium salt, and typical examples thereof include tetramethylammonium salt, trimethylethylammonium salt, dimethyldiethylammonium salt, triethylmethylammonium salt, trimethylbutylammonium salt, dimethylethylpropylammonium salt, dimethylethylbutylammonium salt, dimethyldipropylammonium salt, dimethylpropylbutylammonium salt, dimethyldibutylammonium salt, diethylmethylpropylammonium salt, diethylmethylbutylammonium salt, dipropylmethylethylammonium salt, methylethylpropylbutylammonium

TABLE 1

| Compound Number | General Formula (1) Chemical structure | General Formula (2) Chemical structure |
| --- | --- | --- |
| A1 | 2,7-dimethyloctanedicarboxylic acid<br>HOOC—CH(CH₃)—(CH₂)₄—CH(CH₃)—COOH | 2-methyl-6-ethoxyhexanoic acid<br>HOOC—CH(CH₃)—(CH₂)₄—OEt |
| A2 | 2,7-diethyloctanedicarboxylic acid<br>HOOC—CH(C₂H₅)—(CH₂)₄—CH(C₂H₅)—COOH | 2-ethyl-6-ethoxyhexanoic acid<br>HOOC—CH(C₂H₅)—(CH₂)₄—OEt |
| A3 | 2,7-di-(n-propyl)octanedicarboxylic acid<br>HOOC—CH(C₃H₇)—(CH₂)₄—CH(C₃H₇)—(COOH)₂ | 2-n-propyl-6-ethoxyhexanoic acid<br>HOOC—CH(C₃H₇)—(CH₂)₄—OEt |
| A4 | 2,7-di-(n-butyl)octanedicarboxylic acid<br>HOOC—CH(C₄H₉)—(CH₂)₄—CH(C₄H₉)—COOH | 2-n-butyl-6-ethoxyhexanoic acid<br>HOOC—CH(C₄H₉)—(CH₂)₄—OEt |
| A5 | 2,4-di-(n-butyl)pentanedicarboxylic acid<br>HOOC—CH(C₄H₉)—CH₂—CH(C₄H₉)—COOH | 2-n-butyl-3-ethoxypropanoic acid<br>HOOC—CH(C₄H₉)—CH₂—OEt |
| A6 | 2,5-di-(n-butyl)hexanedicarboxylic acid<br>HOOC—CH(C₄H₉)—(CH₂)₂—CH(C₄H₉)—COOH | 2-n-butyl-4-ethoxybutanoic acid<br>HOOC—CH(C₄H₉)—(CH₂)₂—OEt |
| A7 | 2,9-di-(n-butyl)decanedicarboxylic acid<br>HOOC—CH(C₄H₉)—(CH₂)₆—CH(C₄H₉)—COOH | 2-n-butyl-8-ethoxyoctanoic acid<br>HOOC—CH(C₄H₉)—(CH₂)₆—OEt |
| A8 | 2,11-di-(n-butyl)dodecanedicarboxylic acid<br>HOOC—CH(C₄H₉)—(CH₂)₈—CH(C₄H₉)—COOH | 2-n-butyl-10-ethoxydecanoic acid<br>HOOC—CH(C₄H₉)—(CH₂)₈—OEt |
| A9 | 2,13-di-(n-butyl)tetradecanedicarboxylic acid<br>HOOC—CH(C₄H₉)—(CH₂)₁₀—CH(C₄H₉)—COOH | 2-n-butyl-12-ethoxydodecanoic acid<br>HOOC—CH(C₄H₉)—(CH₂)₁₀—OEt | salt, dibutylmethylethylammonium salt, tripropylmethylammonium salt, dipropylmethylbutylammonium salt, dibutylmethylpropylammonium salt, tributylmethylammonium salt, tetraethylammonium salt, triethylpropylammonium salt, triethylbutylammonium salt, diethyldipropylammonium salt, diethylpropylbutylammonium salt, diethyldibutylammonium salt, tripropylethylammonium salt, dipropylethylbutylammonium salt, dibutylethylpropylammonium salt, tributylethylammonium salt, tetrapropylammonium salt, tripropylbutylammonium salt, dipropyldibutylammonium salt, tributylpropylammonium salt, and the like.

The amine salts include primary, secondary, and tertiary amine salts. Typical examples of the primary amine salts include methylamine, ethylamine, and ethylenediamine salts and the like. Typical examples of the secondary amine salts include dimethylamine, diethylamine, dipropylamine, dibutylamine, methylethylamine, methylpropylamine, methylbutylamine, ethylpropylamine, ethylbutylamine, and propylbutylamine salts, and the like. Typical examples of the tertiary amine salts include trimethylamine, dimethylethylamine, dimethylpropylamine, diethylmethylamine, diethylbutylamine, methylethylpropylamine, methylethylbutylamine, dipropylmethylamine, methylpropylbutylamine, dibutylmethylamine, triethylamine, diethylpropylamine, dipropylethylamine, ethylpropylbutylamine, dibutylethylamine, tripropylamine, dipropylbutylamine, dibutylpropylamine, and tributylamine salts and the like.

In regard to the ratio of the compound represented by General Formula (1) to the compound represented by General Formula (2), the compound represented by General Formula (2) is preferably contained in an amount in the range from few to 45% by molar ratio (i.e., the compound represented by General Formula (1) is present in an amount of 55 or more and less than 100), and the ratio of the compound represented by General Formula (1) to the compound represented by General Formula (2) is more preferably in the range of 90:10 to 55:45, more preferably in the range of 80:20 to 55:45, and still more preferably in the range of 80:20 to 75:25.

Typical examples of the nitro compounds used for the former driving electrolyte include nitrobenzoic acid, nitrophenol, nitroacetophenone, nitroanisole, nitroaniline, nitrobenzylalcohol, nitrophthalic acid, and nitrobenzonitrile. These nitro compounds may also be used in combination of two or more.

Typical examples of the phosphoric acids used for the latter driving electrolyte include orthophosphoric acid, pyrophosphoric acid, polyphosphoric acid, metaphosphoric acid, and the like, and typical examples of the salts thereof include ammonium dihydrogen phosphate, diammonium hydrogen phosphate, ammonium pyrophosphate, ammonium polyphosphate, and the like.

Typical examples of phosphorous acids include hypophosphorous acid and the like, and typical examples of the salts thereof include ammonium hypophosphite, dimethylammonium hypophosphite, diethylammonium hypophosphite, triethylammonium hypophosphite, and the like.

As the phosphoric alkylesters, may be used an ester or two or more esters selected from monomethyl phosphate, dimethyl phosphate, monoethyl phosphate, diethyl phosphate, monopropyl phosphate, dipropyl phosphate, trimethyl phosphate, triethyl phosphate, tributyl phosphate, monohexyl phosphate, monooctyl phosphate, monodecyl phosphate, monobutyl phosphate, and dibutyl phosphate.

The former driving electrolyte above preferably contains a polyvalent alcohol as well as the nitro compound, while the latter driving electrolyte preferably contains a polyvalent alcohol as well as at least one compound selected from the group consisting of phosphoric acids, phosphorous acids, the salts thereof, and phosphoric alkylesters.

The driving electrolytes containing a polyvalent alcohol as the component allow reduction of the decrease in electrical conductivity at high temperature for an extended period of time, drastic increase in spark generation voltage, and thus provide driving electrolytes higher in pressure and heat resistance and extended in lifetime.

Examples of the polyvalent alcohols include glycerin, mannitol, sorbitol, dulcitol, xylitol, pentaerythritol, trimethyrollpropane, ditrimethyrollpropane, neopentyl glycol, dipropylene glycol, butylene glycol, propylene glycol, polyethylene glycol, methyl gluces, maltitol, and the like, and these alcohols are absorbed on the surface of anodic oxide film and cover the defects on the oxide film thereon, thus allowing increase in the water resistance and the sparkover voltage of the anode.

In addition, the driving electrolyte according to the present invention may additionally contain another dibasic acid such as azelaic acid or the like, which has been commonly used as the solute in electrolytic solutions in the amount that does not impart the advantageous features of the driving electrolyte according to the invention.

Figure 1:
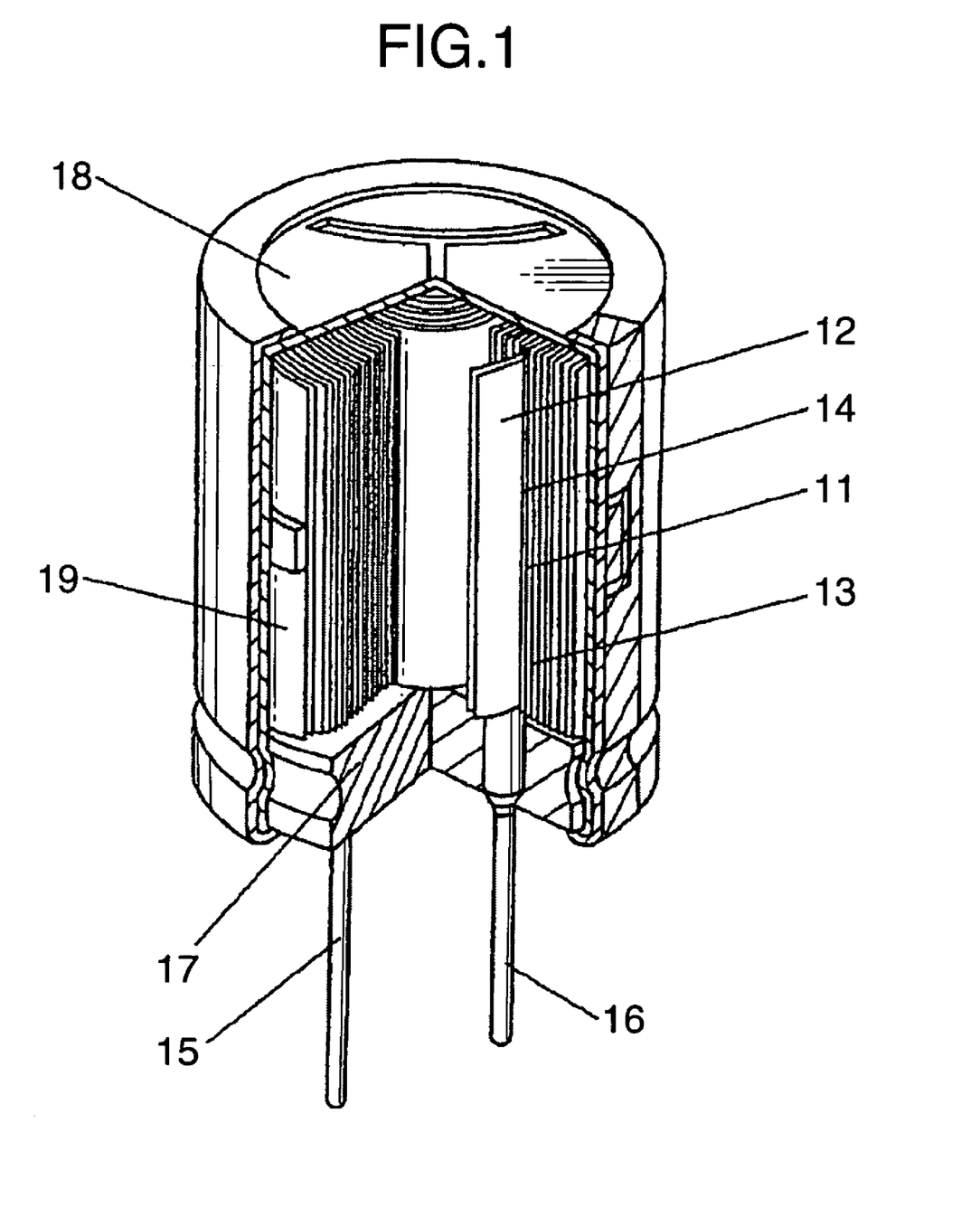
FIG. 1 is a partially notched perspective view illustrating the configuration of an electrolytic capacitor employing a driving electrolyte according to the present invention.

FIG. 1 is a partially notched perspective view illustrating the configuration of an electrolytic capacitor employing the driving electrolyte according to the present invention. The capacitor element 19 in the Figure is formed by winding an anode foil 11, whereof the effective total surface area is previously expanded by etching and a dielectric oxide film us formed by anodic oxidation thereon, and a cathode foil 12 prepared by etching an aluminum foil as they are separated with a separator 13.

An anode lead terminal 15 and a cathode lead terminal 16 are connected respectively to the anode foil 11 and the cathode foil 12 of the capacitor element 19. The capacitor element 19 is placed inside an aluminum case 18 as it is immersed in a driving electrolyte 14, and the opening of the metal case 18 is sealed with a sealing plate 17, to form an electrolyte capacitor. One of the driving electrolytes described above is used as the driving electrolyte 14.

The electrolytic capacitor, having one of the driving electrolytes above as the driving electrolyte, suppresses the decrease in electrical conductivity at high temperature for an extended period of time and improves the chemical self-restoring ability, and thus provides electrolytic capacitors superior in pressure and heat resistance over an extended period of time and extended in lifetime.

Hereinafter, specific EXAMPLES of the present invention will be described.

EXAMPLES 1 TO 7

Driving electrolytes of EXAMPLES 1 to 7 and COMPARATIVE EXAMPLES 1 to 5 were prepared respectively by adding the solute containing the compounds represented by General Formulae (1) and (2) shown in TABLE 1 and a nitro compound to a solvent. The molar ratio shown in the following tables, for example 100:0, means that a ratio of the amount of the solute containing both the compounds represented by General Formulae (1) and (2) subtracted by that of the compound represented by General Formula (2), i.e., the amount of the compound represented by General Formula (1) containing a trace amount of impurities, to the compounds represented by (2) is about 100:0.

The composition, electrical conductivity and sparkover voltage before heat test of each driving electrolyte, and the change in the electrical conductivity and sparkover voltage thereof after heat test in an ampoule at 110° C. for 1,000 hours were determined and the results are summarized in TABLE 2. The change (%) in the table is an increase or decrease after 1,000 hours with respect to 100% of the initial value.

TABLE 2

|  | Constituent | Composition (wt %) | Initial Electrical conductivity (mS/cm) | Initial Sparkover voltage (V) | After heat test at 110° C. for 1000 h Electrical conductivity (mS/cm) | After heat test at 110° C. for 1000 h Sparkover voltage (V) |
|---|---|---|---|---|---|---|
| EXAMPLE 1 | Ethylene glycol | 86.5 | 1.4 | 465 | −12 | 500 |
|  | A1 in Table 1 (molar ratio: 100:0) | 10 |  |  |  |  |
|  | p-Nitrobenzonitrile | 0.5 |  |  |  |  |
|  | Water | 3 |  |  |  |  |
| EXAMPLE 2 | Ethylene glycol | 86.5 | 2.7 | 465 | −8 | 510 |
|  | Ammonium salt of A2 in Table 1 (molar ratio: 80:20) | 10 |  |  |  |  |
|  | p-Nitroacetophenone | 0.5 |  |  |  |  |
|  | Water | 3 |  |  |  |  |
| EXAMPLE 3 | Ethylene glycol | 86 | 2.5 | 475 | −9 | 510 |
|  | Ammonium salt of A3 in Table 1 (molar ratio: 75:25) | 10 |  |  |  |  |
|  | p-Nitrophenol | 1 |  |  |  |  |
|  | Water | 3 |  |  |  |  |
| EXAMPLE 4 | Ethylene glycol | 50 | 2.1 | 480 | −7 | 515 |
|  | Diethylene glycol dimethylether | 36 |  |  |  |  |
|  | Ammonium salt of A6 in Table 1 (molar ratio: 90:10) | 10 |  |  |  |  |
|  | p-Nitroanisole | 1 |  |  |  |  |
|  | Water | 3 |  |  |  |  |
| EXAMPLE 5 | Ethylene glycol | 79 | 2.8 | 485 | −8 | 515 |
|  | Ammonium salt of A4 in Table 1 (molar ratio: 80:20) | 10 |  |  |  |  |
|  | p-Nitrobenzoic acid | 1 |  |  |  |  |
|  | Water | 10 |  |  |  |  |
| EXAMPLE 6 | γ-Butyrolactone | 86 | 1.2 | 500 | −8 | 515 |
|  | Triethylammonium salt of A9 in Table 1 (molar ratio: 90:10) | 10 |  |  |  |  |
|  | p-Nitrobenzylalcohol | 0.5 |  |  |  |  |
|  | p-Nitrophthalic acid | 0.5 |  |  |  |  |
|  | Water | 3 |  |  |  |  |
| EXAMPLE 7 | Ethylene glycol | 80.5 | 1.9 | 480 | −9 | 510 |
|  | Ammonium salt of A7 in Table 1 (molar ratio: 100:0) | 10 |  |  |  |  |
|  | Ammonium azelate | 5 |  |  |  |  |
|  | m-Nitrobenzoic acid | 1 |  |  |  |  |
|  | p-Nitroacetophenone | 0.5 |  |  |  |  |
|  | Water | 3 |  |  |  |  |
| COMPARATIVE EXAMPLE 1 | Ethylene glycol | 86.5 | 3.2 | 370 | −65 | 400 |
|  | Ammonium suberate | 10 |  |  |  |  |
|  | m-Nitrobenzoic acid | 0.5 |  |  |  |  |
|  | Water | 3 |  |  |  |  |
| COMPARATIVE EXAMPLE 2 | Ethylene glycol | 86 | 2.4 | 390 | −25 | 420 |
|  | Ammonium 1,6-decanedicarboxylate | 10 |  |  |  |  |
|  | p-Nitrophenol | 1 |  |  |  |  |
|  | Water | 3 |  |  |  |  |
| COMPARATIVE EXAMPLE 3 | Ethylene glycol | 85 | 2.1 | 450 | −61 | 470 |
|  | Ammonium 5,6-decanedicarboxylate | 10 |  |  |  |  |
|  | o-Nitroacetophenone | 1.5 |  |  |  |  |
|  | m-Nitrophenol | 0.5 |  |  |  |  |
|  | Water | 3 |  |  |  |  |
| COMPARATIVE EXAMPLE 4 | Ethylene glycol | 83.5 | 2.8 | 405 | −68 | 430 |
|  | Ammonium 5,6-decanedicarboxylate | 10 |  |  |  |  |
|  | Ammonium azelate | 3 |  |  |  |  |
|  | p-Nitrophenol | 0.5 |  |  |  |  |
|  | Water | 3 |  |  |  |  |
| COMPARATIVE EXAMPLE 5 | Ethylene glycol | 87 | 2.4 | 460 | −10 | 480 |
|  | Ammonium salt of A3 in Table 1 (molar ratio: 80:20) | 10 |  |  |  |  |
|  | Water | 3 |  |  |  |  |

As apparent from TABLE 2, the driving electrolytes of EXAMPLES 1 to 7 containing a dibasic acid compound having alkyl groups both at α-carbons each had an electrical conductivity extremely smaller than those of COMPARATIVE EXAMPLES 1 to 4. It seems that presence of α-alkyl groups are significantly effective in suppressing the conversion of the dicarboxylic acid into the anhydride and subsequent esterification thereof with ethylene glycol, as well as amidation thereof with ammonia inside the capacitor. Further, even in the presence of a nitro compound, the sparkover voltages of the driving electrolytes of these EXAMPLES are higher than those of COMPARATIVE EXAMPLES 1 to 4, indicating high-temperature and high-voltage stability of these electrolytes.

In contrast, the driving electrolyte of COMPARATIVE EXAMPLE 1 containing ammonium suberate having no alkyl group at the a-carbons exhibited a marked decrease in electrical conductivity after 1,000 hours of heating, indicating an extremely lower electrical stability of the electrolyte.

The decrease in electrical conductivity of the driving electrolyte of COMPARATIVE EXAMPLE 2 containing ammonium 1,6-decanedicarboxylate was greater than those of the driving electrolytes of EXAMPLES 1 to 7 but not as great as that of the driving electrolyte of COMPARATIVE EXAMPLE 1 containing ammonium suberate. It is probably because ammonium 1,6-decanedicarboxylate structurally has a butyl group at the α-carbon of one of the carboxyl groups.

The decrease in electrical conductivity of the driving electrolyte of COMPARATIVE EXAMPLE 4 containing ammonium 5,6-decanedicarboxylate was also great, which seems to be because the vicinal dicarboxyl groups are readily converted into an anhydride and thus esterified by reaction with ethylene glycol. Although ammonium 5,6-decanedicarboxylate has two butyl groups both at the α-carbons, it did not provide desirable electrical characteristics.

In this manner, the driving electrolytes of COMPARATIVE EXAMPLES 1 to 4 showed greater decrease in sparkover voltage by addition of a nitro compound than those of EXAMPLES 1 to 7, and thus were not superior both in heat stability and voltage resistance.

Subsequently, twenty electrolytic capacitors having the configuration set forth in FIG. 1 are prepared by using each of the driving electrolytes of EXAMPLES 1 to 7 and COMPARATIVE EXAMPLES 1 to 5, and were subjected to a ripple load test at 105° C. The results are summarized in TABLE 3. The rated capacitance of the electrolytic capacitors used was 18 μF at 450V.

TABLE 3

| | At an applied voltage of 450 V | | | | | | |
|---|---|---|---|---|---|---|---|
| | Initial properties | | | After ripple load test at 105° C. for 5,000 h | | | |
| | Capacitance (μF) | tan δ (%) | LC (μA) | ΔC (%) | tan δ (%) | LC (μA) | Appearance |
| EXAMPLE 1 | 17.7 | 5.2 | 3.8 | −0.3 | 5.8 | 0.9 | No change |
| EXAMPLE 2 | 17.6 | 4.4 | 4.2 | −0.6 | 4.6 | 1 | No change |
| EXAMPLE 3 | 17.3 | 4.1 | 3.8 | −0.9 | 4.8 | 1.3 | No change |
| EXAMPLE 4 | 17.2 | 4 | 2.9 | −0.6 | 4.6 | 1.7 | No change |
| EXAMPLE 5 | 17.2 | 4.5 | 3.1 | −0.2 | 5.2 | 2.8 | No change |
| EXAMPLE 6 | 17.4 | 5.2 | 3 | −0.6 | 5.5 | 1.9 | No change |
| EXAMPLE 7 | 17.5 | 5.1 | 2.7 | −0.9 | 5.6 | 2.1 | No change |
| COMPARATIVE EXAMPLE 1 | Short circuiting observed during aging in all samples | | | | | | |
| COMPARATIVE EXAMPLE 2 | 17.7 | 4.4 | 2 | Test discontinued due to frequent occurrence of short circuits and explosions | | | |
| COMPARATIVE EXAMPLE 3 | 17.9 | 5.1 | 3.6 | Test discontinued due to frequent occurence of short circuits and explosions | | | |
| COMPARATIVE EXAMPLE 4 | 17.5 | 4.7 | 1.9 | Test discontinued due to frequent occurence of short circuits and explosions | | | |
| COMPARATIVE EXAMPLE 5 | 17.3 | 4.1 | 2.2 | Valves released by the gases generated during test | | | |

As apparent from TABLE 3, the electrolytic capacitors employing the driving electrolytes of EXAMPLES 1 to 7 had fewer incidence of short circuiting during aging and of nonconformities such as short circuiting and explosion over the entire life test, and smaller change in capacitance, tan δ, and leakage current (LC) as well as in appearance after the life test, and were higher in reliability.

On the other hand, all electrolytic capacitors employing the driving electrolyte of COMPARATIVE EXAMPLE 1 showed short circuiting during aging, while many of the electrolytic capacitors employing the driving electrolytes of COMPARATIVE EXAMPLE 2 to 4 showed frequent short circuiting and explosion during the life test. The electrolytic capacitors employing the driving electrolyte of COMPARATIVE EXAMPLE 5 generated a great amount of gases during the life test, breaking the valves open.

EXAMPLES 8 TO 14

Driving electrolytes of EXAMPLES 8 to 14 and COMPARATIVE EXAMPLES 6 to 10 were prepared by adding the solutes containing the compounds represented by General Formulae (1) and (2) shown in TABLE 1 and at least one compound selected from phosphoric acids and phosphorous acids, the salts thereof, and phosphoric alkylesters in a solvent.-

The composition, the electrical conductivity and sparkover voltage before and after heat test in ampoule at 110° C. for 1,000 hours as well as the change in electrical conductivity and sparkover voltage of these driving electrolyte were determined, and the results are summarized in TABLE 4. The change (%) in the table is an increase or decrease after 1,000 hours with respect to 100% of the initial value.

TABLE 4

|  | Constituent | Composition (wt %) | Initial Electrical conductivity (mS/cm) | Initial Sparkover voltage (V) | After heat test at 110° C. for 1000 h Change in conductivity (%) | After heat test at 110° C. for 1000 h Sparkover voltage (V) |
|---|---|---|---|---|---|---|
| EXAMPLE 8 | Ethylene glycol | 86.5 | 1.2 | 480 | −8 | 515 |
|  | A1 in Table 1. (molar ratio: 100:0) | 10 |  |  |  |  |
|  | Water | 3 |  |  |  |  |
|  | Orthophosphoric acid | 0.5 |  |  |  |  |
| EXAMPLE 9 | γ-Butyrolactone | 89.6 | 2.5 | 487 | −10 | 500 |
|  | Ammonium salt of A2 in Table 1 (molar ratio: 80:20) | 8 |  |  |  |  |
|  | Triethylammonium phthalate | 2 |  |  |  |  |
|  | Triethyl phosphate | 0.3 |  |  |  |  |
| EXAMPLE 10 | Ethylene glycol | 89.7 | 2 | 490 | −8 | 525 |
|  | γ-Butyrolactone | 7.5 |  |  |  |  |
|  | Diethylammonium salt of A3 in Table 1 (molar ratio: 70:30) | 2.5 |  |  |  |  |
|  | Ammonium hypophosphite | 0.3 |  |  |  |  |
| EXAMPLE 11 | Ethylene glycol | 82.8 | 2.2 | 495 | −6 | 525 |
|  | Ammonium salt of A4 in Table 1 (molar ratio: 80:20) | 9 |  |  |  |  |
|  | Ammonium benzoate | 3 |  |  |  |  |
|  | Water | 5 |  |  |  |  |
|  | Monobutyl phosphate | 0.2 |  |  |  |  |
| EXAMPLE 12 | Ethylene glycol | 64.2 | 3 | 470 | −8 | 500 |
|  | Water | 20 |  |  |  |  |
|  | Triethylammonium salt of A5 in Table 1 (molar ratio: 90:10) | 10 |  |  |  |  |
|  | Ammonium adipate | 5 |  |  |  |  |
|  | Ammonium hypophosphite | 0.5 |  |  |  |  |
|  | Tributyl phosphate | 0.3 |  |  |  |  |
| EXAMPLE 13 | Ethylene glycol | 78 | 1.3 | 505 | −7 | 515 |
|  | Diethylamine salt of A6 in Table 1 (molar ratio: 75:25) | 9 |  |  |  |  |
|  | Glycerin | 10 |  |  |  |  |
|  | Monooctyl phosphate | 2 |  |  |  |  |
|  | Ammonium hypophosphite | 1 |  |  |  |  |
| EXAMPLE 14 | Ethylene glycol | 73 | 1.6 | 515 | −5 | 530 |
|  | Dimethylammonium salt of A7 in Table 1 (molar ratio: 80:20) | 10 |  |  |  |  |
|  | Ammonium azelate | 5 |  |  |  |  |
|  | Diethylene glycol dimethylether | 10 |  |  |  |  |
|  | Monodecyl phosphate | 1 |  |  |  |  |
|  | Orthophosphoric acid | 1 |  |  |  |  |
| COMPARATIVE EXAMPLE 6 | Ethylene glycol | 80 | 3.2 | 400 | −65 | 425 |
|  | Ammonium suberate | 10 |  |  |  |  |
|  | Water | 5 |  |  |  |  |
|  | Orthophosphoric acid | 5 |  |  |  |  |
| COMPARATIVE EXAMPLE 7 | Ethylene glycol | 82 | 2 | 425 | −25 | 425 |
|  | Ammonium 1,6-decanedicarboxylate | 10 |  |  |  |  |
|  | Water | 3 |  |  |  |  |
|  | Monobutyl phosphate | 5 |  |  |  |  |
| COMPARATIVE EXAMPLE 8 | Ethylene glycol | 77 | 1.7 | 465 | −61 | 475 |
|  | Ammonium 5,6-decanedicarboxylate | 10 |  |  |  |  |
|  | Water | 3 |  |  |  |  |
|  | Monobutyl phosphate | 10 |  |  |  |  |
| COMPARATIVE EXAMPLE 9 | Ethylene glycol | 79 | 2.5 | 430 | −68 | 450 |
|  | Ammonium 5,6-decanedicarboxylate | 10 |  |  |  |  |
|  | Ammonium azelate | 3 |  |  |  |  |
|  | Water | 3 |  |  |  |  |
|  | Orthophosphoric acid | 5 |  |  |  |  |
| COMPARATIVE EXAMPLE 10 | Ethylene glycol | 87 | 2.8 | 420 | −8 | 440 |
|  | Ammonium salt of A4-4-(1) in Table 1 | 10 |  |  |  |  |
|  | Water | 3 |  |  |  |  |

As apparent from TABLE 4, the driving electrolytes of EXAMPLES 8 to 14 containing a dibasic acid compound having alkyl groups both at the α-carbons had an electrical conductivity extremely lower than those of COMPARATIVE EXAMPLES 6 to 9, after each heat test at 110° C. for 1,000 hours. It seems that presence of α-alkyl groups are significantly effective in suppressing the conversion of the dicarboxylic acid into the anhydride and subsequent esterification thereof with ethylene glycol, as well as amidation thereof with ammonia inside the capacitor.

In contrast, the driving electrolyte of COMPARATIVE EXAMPLE 6 containing ammonium suberate, which has no alkyl group at the α-carbon, showed a marked decrease in electrical conductivity after 1,000 hours, indicating the extremely poor electrical stability thereof.

Further, the driving electrolyte of COMPARATIVE EXAMPLE 7 containing ammonium 1,6-decanedicarboxylate showed a decrease in electrical conductivity larger than those of the driving electrolytes of EXAMPLES 8 to 14, but smaller than that of the driving electrolyte of COMPARATIVE EXAMPLE 6 containing ammonium suberate. It is probably because ammonium 1,6-decanedicarboxylate structurally has a butyl group at the α-carbon of one of the carboxyl groups.

The decrease in electrical conductivity of the driving electrolyte of COMPARATIVE EXAMPLE 9 containing ammonium 5,6-decanedicarboxylate was also great, which seems to be because the vicinal dicarboxyl groups are readily converted into an anhydride and thus esterified by reaction with ethylene glycol. Although ammonium 5,6-decanedicarboxylate has two butyl groups both at the c-carbons, it did not provide desirable electrical characteristics.

In addition, the driving electrolytes of COMPARATIVE EXAMPLES 6 to 10 each had a sparkover voltage lower than those of the driving electrolytes of EXAMPLES 8 to 14 even in the presence of a polyvalent alcohol, and thus were not superior both in heat stability and voltage resistance.

Subsequently, twenty electrolytic capacitors having the configuration shown in FIG. 1 were prepared by using each of the driving electrolytes of EXAMPLES 8 to 14 and COMPARATIVE EXAMPLES 6 to 10, and subjected to a ripple load test at 105° C. The results are summarized in TABLE 5. The rated capacitance of the electrolytic capacitors used in these tests was 18 μF at 450 V.

TABLE 5

| | At an applied voltage of 450 V | | | | | | |
|---|---|---|---|---|---|---|---|
| | Initial properties | | | After ripple load test at 105° C. for 5000 h | | | |
| | Capacitance (μF) | tan δ (%) | LC (μA) | ΔC (%) | tan δ (%) | LC (μA) | Appearance |
| EXAMPLE 8 | 17.7 | 5.4 | 3 | −0.1 | 5.7 | 0.9 | No change |
| EXAMPLE 9 | 17.6 | 4.7 | 3.2 | −0.6 | 4.7 | 1.4 | No change |
| EXAMPLE 10 | 17.3 | 4.5 | 2.5 | −0.7 | 4.6 | 1.8 | No change |
| EXAMPLE 11 | 17.2 | 4.3 | 2.2 | −0.4 | 4.7 | 1.7 | No change |
| EXAMPLE 12 | 17.2 | 4.7 | 2.5 | −0.7 | 4.9 | 1.4 | No change |
| EXAMPLE 13 | 17.4 | 4.7 | 3.2 | −0.8 | 5.2 | 1.7 | No change |
| EXAMPLE 14 | 17.5 | 4.6 | 2.8 | −0.5 | 5.1 | 1.4 | No change |
| COMPARATIVE EXAMPLE 6 | Short circuiting observed during aging in all samples | | | | | | |
| COMPARATIVE EXAMPLE 7 | 17.8 | 4.8 | 2.6 | Test discontinued due to frequent occurrence of short circuits and explosions | | | |
| COMPARATIVE EXAMPLE 8 | 17.4 | 4.9 | 3.9 | Test discontinued due to frequent occurrence of short circuits and explosions | | | |
| COMPARATIVE EXAMPLE 9 | 17.5 | 4.7 | 2.8 | Test discontinued due to frequent occurrence of short circuits and explosions | | | |
| COMPARATIVE EXAMPLE 10 | 17.3 | 4.8 | 2.4 | Test discontinued due to frequent occurrence of short circuits and explosions | | | |

As apparent from TABLE 5, the electrolytic capacitors employing the driving electrolytes of EXAMPLES 8 to 14 had fewer incidence of short circuiting during aging and of nonconformity such as short circuiting and explosion over the entire life test, and smaller change in capacitance, tan δ, and leakage current (LC) as well as in appearance after the life test, and were higher in reliability.

On the other hand, all electrolytic capacitors employing the driving electrolyte of COMPARATIVE EXAMPLE 6 showed short circuiting during aging, while the electrolytic capacitors employing the driving electrolyte of COMPARATIVE EXAMPLE 7 to 10 showed frequent short circuiting and explosion during the life test.

EXAMPLES 15 TO 21

Driving electrolytes were prepared by adding a solute containing the compounds represented by General Formulae (1) and (2) shown in TABLE 1, a nitro compound, and a polyvalent alcohols and/or at least one compound selected from the group consisting of phosphoric acids, phosphorous acids, the salts thereof, and phosphoric alkylesters, in an organic solvent, ethylene glycol.

The composition, electrical conductivity and sparkover voltage of each driving electrolyte before heat test, and the change in electrical conductivity and sparkover voltage thereof after heat test in ampoule at 110° C. for 1,000 hours were determined.

The results are summarized in TABLE 6. The change (%) in the table is an increase or decrease after 1000 hours with respect to 100% of the initial value.

TABLE 6

|  | Constituent | Composition (wt %) | Initial Electrical conductivity (mS/cm) | Initial Sparkover voltage (V) | After ampoule test at 110° C. for 1000 h Change in conductivity (%) | After ampoule test at 110° C. for 1000 h Sparkover voltage (V) |
| --- | --- | --- | --- | --- | --- | --- |
| EXAMPLE 15 | Ethylene glycol | 76 | 1 | 485 | −8 | 515 |
|  | A1 in Table 1 (molar ratio: 100:0) | 10 |  |  |  |  |
|  | Glycerin | 10 |  |  |  |  |
|  | p-Nitroacetophenone | 1 |  |  |  |  |
|  | Water | 3 |  |  |  |  |
| EXAMPLE 16 | Ethylene glycol | 80.5 | 2.4 | 485 | −10 | 500 |
|  | Ammonium salt of A2 in Table 1 (molar ratio: 80:20) | 10 |  |  |  |  |
|  | Mannitol | 6 |  |  |  |  |
|  | p-Nitrobenzoic acid | 0.5 |  |  |  |  |
|  | Water | 3 |  |  |  |  |
| EXAMPLE 17 | Ethylene glycol | 80 | 2.2 | 490 | −8 | 520 |
|  | Ammonium salt of A3 in Table 1 (molar ratio: 75:25) | 10 |  |  |  |  |
|  | Xylitol | 6 |  |  |  |  |
|  | p-Nitrophenol | 1 |  |  |  |  |
|  | Water | 3 |  |  |  |  |
| EXAMPLE 18 | Ethylene glycol | 83.5 | 2 | 490 | −6 | 520 |
|  | Ammonium salt of A6 in Table 1 (molar ratio: 90:10) | 10 |  |  |  |  |
|  | Triethyl phosphate | 0.5 |  |  |  |  |
|  | Mannitol | 3 |  |  |  |  |
|  | Water | 3 |  |  |  |  |
| EXAMPLE 19 | Ethylene glycol | 83.5 | 1.9 | 510 | −8 | 535 |
|  | Ammonium salt of A4 in Table 1 (molar ratio: 80:20) | 10 |  |  |  |  |
|  | Sorbitol | 3 |  |  |  |  |
|  | Monobutyl phosphate | 0.5 |  |  |  |  |
|  | Water | 3 |  |  |  |  |
| EXAMPLE 20 | Ethylene glycol | 78.5 | 1.1 | 540 | −6 | 555 |
|  | Triethylamine salt of A9 in Table 1 (molar ratio: 90:10) | 10 |  |  |  |  |
|  | Glycerin | 5 |  |  |  |  |
|  | Mannitol | 3 |  |  |  |  |
|  | Orthophosphoric acid | 0.5 |  |  |  |  |
|  | Water | 3 |  |  |  |  |
| EXAMPLE 21 | Ethylene glycol | 75.5 | 1.5 | 510 | −5 | 535 |
|  | Ammonium salt of A7 in Table 1 (molar ratio: 100:0) | 10 |  |  |  |  |
|  | Ammonium azelate | 5 |  |  |  |  |
|  | Mannitol | 3 |  |  |  |  |
|  | o-Nitroanisole | 3 |  |  |  |  |
|  | Ammonium hypophosphite | 0.5 |  |  |  |  |
|  | Water | 3 |  |  |  |  |
| COMPARATIVE EXAMPLE 11 | Ethylene glycol | 82 | 3 | 400 | −65 | 420 |
|  | Ammonium suberate | 10 |  |  |  |  |
|  | Glycerin | 5 |  |  |  |  |
|  | Water | 3 |  |  |  |  |
| COMPARATIVE EXAMPLE 12 | Ethylene glycol | 82 | 2.1 | 420 | −25 | 430 |
|  | Ammonium 1,6-decanedicarboxylate | 10 |  |  |  |  |
|  | Polyethylene oxide (molecular weight 1000) | 5 |  |  |  |  |
|  | Water | 3 |  |  |  |  |
| COMPARATIVE EXAMPLE 13 | Ethylene glycol | 82 | 1.8 | 470 | −61 | 480 |
|  | Ammonium 5,6-decanedicarboxylate | 10 |  |  |  |  |
|  | Mannitol | 2 |  |  |  |  |
|  | Glycerin | 3 |  |  |  |  |
|  | Water | 3 |  |  |  |  |
| COMPARATIVE EXAMPLE 14 | Ethylene glycol | 88 | 2.6 | 430 | −68 | 460 |
|  | Ammonium 5,6-decanedicarboxylate | 10 |  |  |  |  |
|  | Ammonium azelate | 2 |  |  |  |  |
|  | Sorbitol | 2 |  |  |  |  |
|  | Water | 3 |  |  |  |  |
| COMPARATIVE EXAMPLE 15 | Ethylene glycol | 84 | 2.8 | 420 | −8 | 440 |
|  | Ammonium salt of A4 in Table 1 | 13 |  |  |  |  |
|  | Water | 3 |  |  |  |  |

As apparent from TABLE 6, the driving electrolytes of EXAMPLES 15 to 21 containing a dibasic acid compound having alkyl groups both at the α-carbons had an electrical conductivity extremely lower than those of COMPARATIVE EXAMPLES 11 to 14, after each heat test at 110° C. for 1,000 hours. It seems that presence of α-alkyl groups of the compounds described in TABLE 1 are significantly effective in suppressing the conversion of the dicarboxylic acid into the anhydride and subsequent esterification thereof with ethylene glycol, as well as amidation thereof with ammonia inside the capacitor. In particular, dibasic acids having alkyl groups both at the α-positions of terminal dicarboxylic acids or the salts thereof shown in General Formula (1) are more effective.

In contrast, the driving electrolyte of COMPARATIVE EXAMPLE 11 containing ammonium suberate having no alkyl group at the α-carbons exhibited a marked decrease in electric conductivity after 1,000 hours of heating, indicating that the electrolyte is extremely poorer in electrical stability.

The driving electrolyte of COMPARATIVE EXAMPLE 12 containing ammonium 1,6-decanedicarboxylate showed a decrease in electrical conductivity larger than those of the driving electrolytes of EXAMPLES 15 to 21 but smaller than that of the driving electrolyte of COMPARATIVE EXAMPLE 11 containing ammonium suberate. It is probably because ammonium 1,6-decanedicarboxylate has structurally a butyl group at the α-carbon of a carboxyl group.

The driving electrolyte of COMPARATIVE EXAMPLE 14 containing ammonium 5,6-decanedicarboxylate also showed a greater decrease in electrical conductivity, which seems to be because the vicinal dicarboxyl groups are readily converted into an anhydride and thus esterified by reaction with ethylene glycol. Although ammonium 5,6-decanedicarboxylate has two butyl groups both at the α-carbons, it did not provide desirable electrical characteristics.

The driving electrolytes of COMPARATIVE EXAMPLES 11, 12, 14, and 15 each had a sparkover voltage lower than those of the driving electrolytes of EXAMPLES 15 to 21 even in the presence of a polyvalent alcohol, and thus were not superior both in heat stability and voltage resistance.

Subsequently, twenty electrolytic capacitors having the configuration shown in FIG. 1 were prepared by using each of the driving electrolytes of EXAMPLES 15 to 21 and COMPARATIVE EXAMPLES 11 to 15, and subjected to the ripple load test at 105° C. The results are summarized in TABLE 5. The rated capacitance of the electrolytic capacitors used in these tests was 18 μF at 450 V.

TABLE 7

At an applied voltage of 450 V

| | Initial properties | | | After ripple load test at 105° C. for 5000 h | | | |
|---|---|---|---|---|---|---|---|
| | Capacitance (μF) | tan δ (%) | LC (μA) | ΔC (%) | tan δ (%) | LC (μA) | Appearance |
| EXAMPLE 15 | 17.6 | 5.5 | 2.9 | −0.1 | 5.8 | 0.9 | No change |
| EXAMPLE 16 | 17.5 | 4.5 | 3.4 | −0.6 | 4.7 | 1.3 | No change |
| EXAMPLE 17 | 17.2 | 4.4 | 2.3 | −0.7 | 4.6 | 1.8 | No change |
| EXAMPLE 18 | 17.4 | 4.5 | 1.8 | −0.4 | 4.8 | 0.7 | No change |
| EXAMPLE 19 | 17.2 | 4.6 | 2.7 | −0.7 | 4.9 | 1.4 | No change |
| EXAMPLE 20 | 17.6 | 4.7 | 3 | −0.8 | 4.9 | 1.7 | No change |
| EXAMPLE 21 | 17.6 | 4.8 | 2.4 | −0.5 | 4.9 | 1.2 | No change |
| COMPARATIVE EXAMPLE 11 | Short circuiting observed during aging in all samples | | | | | | |
| COMPARATIVE EXAMPLE 12 | 17.8 | 4.7 | 2.6 | Test discontinued due to frequent occurrence of short circuits and explosions | | | |
| COMPARATIVE EXAMPLE 13 | 17.4 | 4.7 | 3.9 | Test discontinued due to frequent occurrence of short circuits and explosions | | | |
| COMPARATIVE EXAMPLE 14 | 17.6 | 4.9 | 2.8 | Test discontinued due to frequent occurrence of short circuits and explosions | | | |
| COMPARATIVE EXAMPLE 15 | 17.3 | 4.6 | 2.4 | Test discontinued due to frequent occurrence of short circuits and explosions | | | |

As apparent from TABLE 7, the electrolytic capacitors employing the driving electrolytes of EXAMPLES 15 to 21 had fewer incidence of short circuiting during aging and of nonconformity such as short circuiting and explosion over the entire life test, and smaller change in capacitance, tan δ, and leakage current (LC) as well as in appearance after the life test, and were higher in reliability.

It is because heat stabilizing effect of the compounds represented by General Formula (1) and (2) are effective in heat stabilization of the electrolytes and addition of a nitro compound and/or at least one compound selected from the group consisting of phosphoric acids, phosphorous acids, the salts thereof, and phosphoric alkylesters suppresses the reaction with aluminum electrode foil at high temperature and gas generation and accelerate restoration of the defective portions of the electrode foil, improving the reliability of capacitors under a load of high temperature. Addition of a polyvalent alcohol, which is absorbed on the surface of the anodic oxide film and covers the defective portions of the oxide film, further improves the water resistance of the aluminum-electrode foil, raises the sparkover voltage, and thus provides more reliable capacitors.

On the other hand, all electrolytic capacitors employing the driving electrolyte of COMPARATIVE EXAMPLE 11 showed short circuiting during aging, while the electrolytic capacitors employing the driving electrolytes of COMPARATIVE EXAMPLE 12 to 15 showed frequent short circuiting and explosion during the life test.

What is claimed is:

1. A driving electrolyte comprising a solvent, a solute containing the following compounds represented by General Formulae (1) and (2) prepared by synthesis, and a nitro compound, wherein each of $R^1$ and $R^2$ is independently an alkyl group; each of $M^1$ and $M^2$ is a functional group selected from the group consisting of a hydrogen atom, an ammonium group and an amine group; and n is an integer of 0 to 14, wherein $R^3$ is an alkyl group; $R^4$ is a functional group selected from the group consisting of a hydrogen atom, a methyl group and an ethyl group; $M^3$ is a functional group selected from the group consisting of a hydrogen atom, an ammonium group and an amine group; and m is an integer of 0 to 14.

2. The driving electrolyte according to claim 1, wherein the compounds represented by said General Formulae (1) and (2) are respectively ammonium salt or amine salt.

3. The driving electrolyte according to claim 1, wherein the amount of the nitro compound is 0.1 to 10 wt %.

4. The driving electrolyte according to claim 1, wherein each of said $R^1$, $R^2$ and $R^3$ is an alkyl group having 1 to 7 carbons.

5. The driving electrolyte according to claim 1, further comprising a polyvalent alcohol in addition to said nitro compound.

6. A driving electrolyte comprising a solvent, a solute containing the following compounds represented by General Formulae (1) and (2) prepared by synthesis, and at least one compound selected from the group consisting of phosphoric acids, phosphorous acids, the salts thereof, and phosphoric alkylesters, wherein each of $R^1$ and $R^2$ is independently an alkyl group; each of $M^1$ and $M^2$ is a functional group selected from the group consisting of a hydrogen atom, an ammonium group and an amine group; and n is an integer of 0 to 14, wherein $R^3$ is an alkyl group; $R^4$ is a functional group selected from the group consisting of a hydrogen atom, a methyl group and an ethyl group; $M^3$ is a functional group selected from the group consisting of a hydrogen atom, an ammonium group and an amine group; and m is an integer of 0 to 14.

7. The driving electrolyte according to claim 6, wherein the compounds represented by said General Formulae (1) and (2) are respectively ammonium salt or amine salt.

8. The driving electrolyte according to claim 6, wherein the total amount of the phosphoric acids, the phosphorous acids, the salts thereof, and the phosphoric alkylesters is 0.1 to 10 wt %.

9. The driving electrolyte according to claim 6, wherein each of said $R^1$, $R^2$ and $R^3$ is an alkyl group having 1 to 7 carbons.

10. The driving electrolyte according to claim 6, further comprising a polyvalent alcohol in addition to the at least one compound selected from the group consisting of the phosphoric acids, the phosphorous acids, the salts thereof, and the phosphoric alkylesters.

11. An electrolytic capacitor using a driving electrolyte, said driving electrolyte comprising a solvent, a solute containing the following compounds represented by General Formulae (1) and (2) prepared by synthesis, and a nitro compound, wherein each of $R^1$ and $R^2$ is independently an alkyl group; each of $M^1$ and $M^2$ is a functional group selected from the group consisting of a hydrogen atom, an ammonium group and an amine group; and n is an integer of 0 to 14, wherein $R^3$ is an alkyl group; $R^4$ is a functional group selected from the group consisting of a hydrogen atom, a methyl group and an ethyl group; $M^3$ is a functional group selected from the group consisting of a hydrogen atom, an ammonium group and an amine group; and m is an integer of 0 to 14.

12. The electrolytic capacitor according to claim 11, wherein said compounds represented by General Formulae (1) and (2) are respectively ammonium salt or amine salt.

13. The electrolytic capacitor according to claim 11, wherein the amount of said nitro compound in said driving electrolyte is 0.1 to 10 wt %.

14. The electrolytic capacitor according to claim 11, wherein each of said $R^1$, $R^2$ and $R^3$ is an alkyl group having 1 to 7 carbons.

15. The electrolytic capacitor according to claim 11, wherein said driving electrolyte further comprises a polyvalent alcohol in addition to said nitro compound.

16. An electrolytic capacitor using a driving electrolyte, said driving electrolyte comprising a solvent, a solute containing the following compounds represented by General Formulae (1) and (2) prepared by synthesis, and at least one compound selected from the group consisting of phosphoric acids, phosphorous acids, the salts thereof, and phosphoric alkylesters, (1)

wherein each of $R^1$ and $R^2$ is independently an alkyl group; each of $M^1$ and $M^2$ is a functional group selected from the group consisting of a hydrogen atom, an ammonium group and an amine group; and n is an integer of 0 to 14, (2)

wherein $R^3$ is an alkyl group; $R^4$ is a functional group selected from the group consisting of a hydrogen atom, a methyl group and an ethyl group; $M^3$ is a functional group selected from the group consisting of a hydrogen atom, an ammonium group and an amine group; and m is an integer of 0 to 14.

17. The electrolytic capacitor according to claim 16, wherein the compounds represented by said General Formulae (1) and (2) are respectively ammonium salt or amine salt.

18. The electrolytic capacitor according to claim 16, wherein the total amount of the phosphoric acids, the phosphorous acids, the salts thereof, and the phosphoric alkylesters in the driving electrolyte is 0.1 to 10 wt %.

19. The electrolytic capacitor according to claim 16, wherein each of said $R^1$, $R^2$ and $R^3$ is an alkyl group having 1 to 7 carbons.

20. The electrolytic capacitor according to claim 16, wherein the driving electrolyte further comprises a polyvalent alcohol in addition to the at least one compound selected from the group consisting of the phosphoric acids, phosphorous acids, the salts thereof, and phosphoric alkylesters.

* * * * *